US010282203B2

(12) United States Patent
Hayes et al.

(10) Patent No.: US 10,282,203 B2
(45) Date of Patent: May 7, 2019

(54) METHODS AND DEVICES FOR DISCOVERING MULTIPLE INSTANCES OF RECURRING VALUES WITHIN A VECTOR WITH AN APPLICATION TO SORTING

(71) Applicant: BARCELONA SUPERCOMPUTING CENTER—CENTRO NACIONAL DE SUPERCOMPUTACIÓN, Barcelona (ES)

(72) Inventors: Timothy Hayes, Barcelona (ES); Oscar Palomar Pérez, Barcelona (ES); Osman Unsal, Barcelona (ES); Adrian Cristal Kestelman, Barcelona (ES); Mateo Valero Cortés, Barcelona (ES)

(73) Assignee: BARCELONA SUPERCOMPUTING CENTER—CENTRO NACIONAL DE SUPERCOMPUTACIÓN, Barcelona (ES)

( * ) Notice: Subject to any disclaimer, the term of this patent is extended or adjusted under 35 U.S.C. 154(b) by 82 days.

(21) Appl. No.: 15/548,083

(22) PCT Filed: Feb. 5, 2015

(86) PCT No.: PCT/EP2015/052394
§ 371 (c)(1),
(2) Date: Aug. 1, 2017

(87) PCT Pub. No.: WO2016/124242
PCT Pub. Date: Aug. 11, 2016

(65) Prior Publication Data
US 2018/0018173 A1    Jan. 18, 2018

(51) Int. Cl.
*G06F 9/30* (2018.01)
*G06F 7/24* (2006.01)

(52) U.S. Cl.
CPC ............ *G06F 9/30021* (2013.01); *G06F 7/24* (2013.01); *G06F 9/30032* (2013.01); *G06F 9/30036* (2013.01)

(58) Field of Classification Search
None
See application file for complete search history.

(56) References Cited

U.S. PATENT DOCUMENTS

2017/0048528 A1*   2/2017   Filippov .............. H04N 19/176

OTHER PUBLICATIONS

International Search Report and Written Opinion dated Oct. 14, 2015 for PCT/EP2015/052394, 12 pages.
Krste Asanović, "Vector Microprocessors", PhD thesis, 1998, University of California, Berkeley, section 2.2.2, 268 pages.
(Continued)

*Primary Examiner* — William B Partridge
(74) *Attorney, Agent, or Firm* — Squire Patton Boggs (US) LLP

(57) ABSTRACT

Methods and devices for discovering multiple instances of recurring values within a vector are disclosed. A first method calculates the prior instances of the vector. A second method calculates the last unique instances of the vector. An implementation of these methods as SIMD instructions is proposed. Sequential and parallel CAM implementations are also disclosed. The proposed methods can be used to correct conflicting indexes in vector memory indexed operations. Furthermore, an application to a vectorized sorting algorithm is proposed.

17 Claims, 11 Drawing Sheets

(56) References Cited

OTHER PUBLICATIONS

Cray Assembly Language (CAL) for Cray X1™ Systems Reference Manual, S-2314-51—Oct 2003, 7.7. Vector Register Instructions, 302 pages.

Flynn, Michael J., "Some Computer Organizations and Their Effectiveness", IEEE Transactions on Computers, vol. c-21, No. 9, Sep. 1972, 44 pages.

M. Zagha and G. E. Blelloch, "Radix Sort for Vector Multiprocessors," Proceedings of the 1991 ACM/IEEE Conference on Supercomputing, ser. Supercomputing '91, 1991, pp. 712-721.

\* cited by examiner

|  | 0 | 1 | 2 | 3 | 4 | 5 | 6 | 7 |
|---|---|---|---|---|---|---|---|---|
| in | 7 | 5 | 5 | 5 | 11 | 9 | 9 | 11 |
| out | 1 | 0 | 0 | 1 | 0 | 0 | 1 | 1 |

Fig. 2a

METHODS AND DEVICES FOR DISCOVERING MULTIPLE INSTANCES OF RECURRING VALUES WITHIN A VECTOR WITH AN APPLICATION TO SORTING

The present disclosure relates to computer science and more specifically to methods and devices for discovering multiple instances of recurring values within a vector as well as their application in sorting algorithms.

BACKGROUND ART

Single instruction multiple data (SIMD) is a class of parallel computers. SIMD describes computers with multiple processing elements that perform the same operation on multiple data points simultaneously. Thus, such machines exploit data level parallelism (DLP). That is, there are simultaneous (parallel) computations, but only a single control process (instruction) at a given moment. SIMD instructions are used in SIMD and vector architectures (see Flynn, "Some Computer Organizations and Their Effectiveness, IEEE Transactions On Computers, Vol. c-21, No. 9, September 1972). SIMD instruction sets offer an efficient way to accelerate DLP. A specific way of providing support for SIMD instructions is through vector processing systems, i.e. computer systems using vector architecture. This patent uses the terms "vector" and "SIMD" interchangeably.

A vector processing system is a system configured to process a plurality of values with a single instruction. The vector processing system may comprise a number of vectors, or vector registers, each having a number of elements with a unique index assigned to each element. The indexes may be assigned in an ascending order, the ascending order corresponding to the position of the elements in the vectors. Implementing an algorithm using SIMD instructions may be considered an algorithm vectorization.

Sorting is a widely studied problem in computer science and an elementary building block in many of its subfields including scientific computing and database management systems.

Radix Sort is a non-comparative numerical sorting algorithm. Zagha et al. (see M. Zagha and G. E. Blelloch, "*Radix Sort for Vector Multiprocessors*," Proceedings of the 1991 ACM/IEEE Conference on Supercomputing, ser. Supercomputing '91, 1991, pp. 712-721) proposed a way to vectorize Radix Sort. The vectorized Radix sort algorithm requires storing data to arrays using indexed accesses. In indexed accesses, the elements may be located at arbitrary locations in memory with the addresses of the elements indicated by the contents of a second vector. This is known as gather in its load form. Accordingly, the term scatter is used in its store form, respectively. During a scattering operation, multiple elements within the same vector may index to the same memory location thus causing a conflict. To prevent this conflict, vectorized radix sort replicates the involved arrays, which in itself is a drawback. The other main drawback in this technique is that the array being sorted needs to be accessed with a non-contiguous (stride) pattern.

The existing SIMD instruction sets (see e.g. Cray Assembly Language (CAL) for Cray X1™ Systems Reference Manual, S-2314-51—October 2003, 7.7. Vector Register Instructions) used by microprocessor architectures, such as the Cray X1™ systems, do not offer a direct solution for handling such conflicts. One skilled in the art may appreciate that vectorized Radix sort is only one example of an algorithm with a need to avoid conflicts when scattering to an array. In order to vectorize other algorithms conflicts may also need to be avoided when scattering to an array.

It is desirable to provide new SIMD instructions and vectorized sorting algorithms that would avoid conflicts with the use of the new SIMD instructions.

SUMMARY OF THE INVENTION

Two new instructions are proposed to be included in SIMD Instruction-Set Architectures (ISAs) and two different ways of realizing these instructions in hardware are also proposed. Subsequently a sorting algorithm is proposed that takes advantage of the new instructions.

According to a first aspect, in a vector processing system configured to process a plurality of values, belonging to a data set, a method for discovering multiple instances of recurring values within the input vector is disclosed. The method comprises loading the values to a vector, hereafter called input vector. Each element of the input vector is selected and then compared with all elements of the input vector having an index lower than the index of the selected element, to calculate the number of matches for the selected element. The number of matches is the number of elements having the same value as the selected element. Then a first output vector is generated, having the same number of elements as the input vector and the same indexes. Each element of the input vector corresponds to the element of the first output vector having the same index. Each element of the first output vector has a value equal to the number of matches calculated for the corresponding element of the input vector.

Using the aforementioned method it is possible to assert exactly how many instances of a value in the corresponding element of the input vector are present at elements of the input vector with a lower index. This method may be implemented as a new SIMD instruction. The new SIMD instruction, as disclosed herein, shall be hereafter called Vector Prior Instances (VPI).

In some implementations, the method may further comprise setting first the values of the elements of the first output vector equal to zero. Then, for each selected element of the input vector and for each element in the input vector having an index lower than the index of the selected element, the value of the selected element may be compared with the value of the element in the input vector having an index lower than the index of the selected element to identify a match. Generating a first output vector may comprise incrementing by one the value of the element of the first output vector corresponding to the selected element when said comparing identifies a match. These implementations of VPI may be suitable for input vectors with a limited number of elements as they do not scale linearly with the number of elements of the input vector.

In some examples, the method may further comprise comparing the values of the elements of the input vector to each other to identify equal values and generating a second output vector of the same number of elements as the input vector and with the same indexes in response to said comparing. Each element of the input vector may then correspond to the element of the second output vector having the same index. The value of each element of the second output vector may be set equal to a first value unless the corresponding element of the input vector has a value equal to the value of an element of the input vector with an index higher than the index of the corresponding element. Then the value of said element of the second output vector may be set equal to a second value.

It is thus possible to mark, in the second output vector, the last instance of all values present at the elements of the input vector. The second output vector may be considered a vector mask. This method as well may be implemented as a new SIMD instruction. This new instruction, as disclosed herein, shall be hereafter called Vector Last Unique (VLU). It is noted that the two instructions (VPI and VLU) as disclosed herein may be used independently or together to vectorize various algorithms.

In some implementations, the method may further comprise providing a Content Addressable Memory (CAM) having a number of entries equal to the number of elements of the input vector. Each entry of the CAM may comprise at least a key field, a count field and a valid field. An entry is considered valid when its valid field is set equal to a third value and considered not valid when set equal to a fourth value. The method may further comprise setting first the valid field of all entries equal to the fourth value. Each element of the input vector may then be selected in an index ascending order. Then each selected element may be simultaneously compared with the key field of all valid entries to either identify a matching entry having a key field equal to the value of the selected element or to generate a new valid entry otherwise. When a matching entry is identified, the value of the element of the first output vector corresponding to the selected element may be set equal to the count field of the matching entry. Then the count field of the matching entry may be incremented by one. When a new valid entry is generated, a not valid entry may first be selected. Then, the valid field of the selected entry may be set equal to the third value. Subsequently, the key field of the selected entry may be set equal to the value of the selected element. In a next step the value of the element of the output vector corresponding to the selected element may be set equal to zero. Finally, the count field of the selected entry may be set to one.

These implementations of the VPI instruction using a CAM scale linearly with the number of elements of the input vector.

In some examples, each entry of the CAM may further comprise a last index field. The last index field may be updated every time a matching entry is identified and every time a new valid entry is generated. The updated last index field may be set equal to the index of the selected element. After updating the last index field for all elements, the second output vector may be generated by setting the value of each element of the second output vector having an index equal to the last index field of a valid entry equal to the first value and the rest may be set equal to the second value.

Therefore, the updating of the last index field may be performed at the same time when the first output vector is generated. Subsequently, the generation of the second output vector requires a single step.

In some examples, a plurality of elements of the input vector may be selected and processed in parallel. This may be done by increasing the number of ports of the CAM structure. Thus the process may be further accelerated. Such parallel processing may comprise selecting simultaneously a plurality of adjacent elements of the input vector, comparing the simultaneously selected values to each other and processing in parallel the plurality of values if said comparison does not identify any match. Otherwise the process may not proceed in parallel but sequentially for the selected plurality of values. By processing in parallel only when said comparison does not identify a match, it is ensured that no errors are introduced during the parallel processing, i.e. that an unpredictable output is not provided, and therefore that the output is correct.

In some examples, the second output vector may be used as a mask on the first output vector to select elements of the first output vector and generate a third output vector. Generating the third output vector may comprise identifying the elements of the second output vector having the first value and compressing the first output vector into the third output vector by using the elements of the second output vector having the first value as mask. The term "compress" as used herein, refers to a vector compress instruction as defined in Krste Asanović, "*Vector Microprocessors*", PhD thesis, 1998, University of California, Berkeley, section 2.2.2 (Asanović, 1998). That is, the compress instruction compacts elements at locations indicated by a mask register from an input vector (source vector register) to contiguous elements at the start of an output vector (destination vector register). The elements can then be processed with subsequent vector instructions more efficiently than if masked instructions were used throughout.

In some examples the third output vector may be used to increment a histogram array. A histogram array is an array of elements. Each of these elements is known as a bin. Each bin has a unique identifier known as bin id. When updating the histogram array with a given array, the content of a bin of the histogram array is incremented by the number of elements of the given array with a value equal to the bin id of said bin.

To increment the histogram array with the input vector as the given array, one may be added to the values of the elements of the third output vector to generate a fourth output vector. Then, the input vector may be compressed into a fifth output vector by using the second output vector as mask. The values of the elements of the fifth output vector may then be used as indexes to gather from the histogram array to a sixth output vector. Subsequently, a seventh output vector may be generated by adding the values of the elements of the sixth output vector to the values of the fourth output vector. Finally, the values of the elements of the fifth output vector may be used as indexes to scatter the values of the elements of the seventh output vector to the histogram array.

In another aspect, a sorting method is disclosed. An initial input array having at most n×m values organized in at least n consecutive blocks of at most m consecutive values may be provided. Each value may have z number of bits. A plurality j of subsets of bits of the values may be defined. Let $z_k$ be the number of bits of subset k, k=1 to j, wherein $z_1+z_2+ \ldots +z_j=z$ and wherein all bits of a subset k−1, k=2 to j, are less significant than all bits of a subset k. Then for each subset of bits k, k=1 to j, starting from k=1 and in a consecutive order, the following steps may be repeated: first, the histogram array may be reset by setting all its values to zero. Then, for each block i, i=1 to n, starting from i=1 and in a consecutive order, the following steps may be repeated: first, the values of an eighth vector of at least m number of elements may be set equal to the values of the block i while maintaining in the eighth output vector the consecutive order said values had in the input array; then, the value of each element of the input vector may be set equal to the subset k of bits of the value of the element in the eighth output vector having the same index; then the histogram array may be updated according to example methods disclosed herein and using the instructions VPI and VLU. Then, after all blocks have been processed, a prefix sum of the histogram array may be generated. The value of the first element of the prefix sum may be set equal to zero and the value of each of the rest of the elements of the prefix sum may be set equal to the sum of the value of the element having the previous index in the prefix sum plus the value of the element of the histogram array having the same previous index. Then, for each block i, i=1 to n, starting from i=1 and in a consecutive order, the following steps may be repeated: the values of the eighth output vector may be set equal to the values of the block while maintaining in the eighth output vector the consecutive order said values had in the input array; the value of each element of the input vector may be set equal to the subset k of bits of the value of the element in the eighth output vector having the same index; the first and second output vectors may be generated according to example methods disclosed herein and using the instructions VPI and VLU; a ninth output vector may be generated by using the values of the elements of the input vector as indexes to gather from the prefix sum; a tenth output vector may be generated by adding the values of the elements of the first output vector and the ninth output vector; the tenth output vector may be compressed into an eleventh output vector by using the second output vector as mask; one may be added to the values of the elements of the eleventh output vector to generate a twelfth output vector; the input vector may be compressed into a thirteenth vector by using the second output vector as mask; the values of the elements of the thirteenth vector may be used as indexes to scatter the values of the elements of the twelfth output vector to the prefix sum; the values of the elements of the tenth output vector may be used as indexes to scatter the values of the elements of the eighth output vector to the output array. Then, after all blocks have been processed, the input array may be set equal to the output array. Finally, after all subsets of bits have been processed, the output array may be provided as the sorted initial input array.

Using the VPI, VLU instructions the proposed sorting algorithm is efficiently vectorizable. Without VPI and VLU, the only known method to vectorize the radix sort algorithm requires replicating the histogram arrays. This has several consequences that lead to substantial less performance, one of them being the use of large strided access patterns. With VPI, VLU instructions a much more efficient unit-stride access is used instead.

In some examples, when $z_k=b$ the histogram array may comprise $2^b$ bins. For example, when $z_k=2$ the histogram array may comprise $2^2$ bins.

In another aspect, a computing device is disclosed. The computing device may comprise a memory and a processor. The memory may store computer program instructions executable by the processor. Said instructions may comprise functionality to execute a method according to embodiments disclosed herein.

In yet another aspect, a computer program product is disclosed. The computer program product may comprise instructions to provoke that a computing device implements a method according to embodiments disclosed herein.

The computer program product may be embodied on a storage medium (for example, a CD-ROM, a DVD, a USB drive, on a computer memory or on a read-only memory) or carried on a carrier signal (for example, on an electrical or optical carrier signal).

The computer program may be in the form of source code, object code, a code intermediate source and object code such as in partially compiled form, or in any other form suitable for use in the implementation of the processes. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, the relevant methods.

Additional objects, advantages and features of embodiments of the invention will become apparent to those skilled in the art upon examination of the description, or may be learned by practice of the invention.

BRIEF DESCRIPTION OF THE DRAWINGS

FIG. 2a shows an illustrative example of the VLU instruction semantics.

DETAILED DESCRIPTION OF EMBODIMENTS

Figure 1:
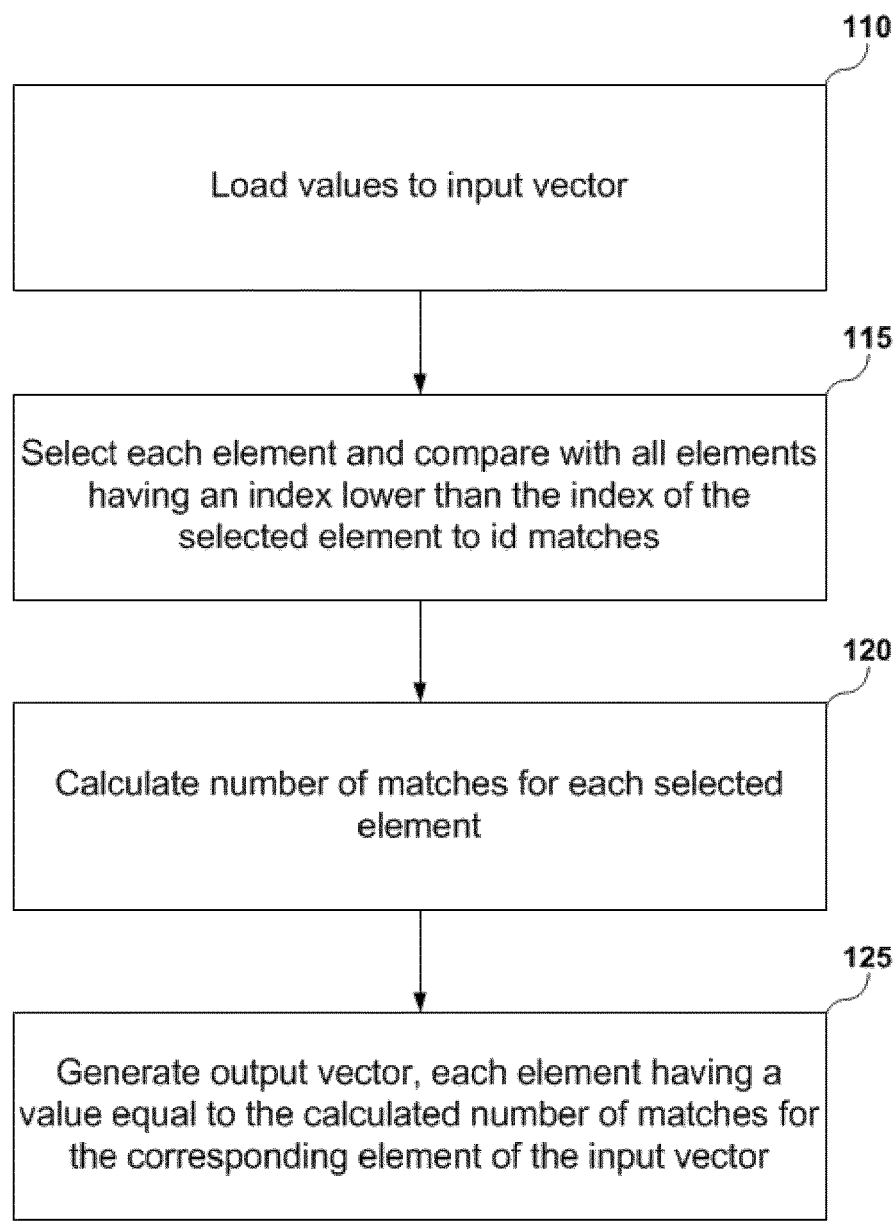
FIG. 1 shows an example flow diagram of a method of calculating the prior instances of a vector.

FIG. 1 shows an example flow diagram of a method of calculating the prior instances of a vector. In first step 110, the values are loaded to a vector of a vector processing system, hereafter called input vector. Then, in step 115, each element of the input vector is selected and compared with all elements of the input vector having an index lower than the index of the selected element to identify matches. In step 120, the number of matches for each selected element is calculated. The number of matches is the number of elements having an index lower than the index of the selected element that have the same value as the selected element. In step 125, a first output vector is generated. The first output vector has the same number of elements as the input vector and the same indexes. Furthermore, each element of the input vector corresponds to the element of the first output vector having the same index. Each element of the first output vector has a value equal to the number of matches calculated for the corresponding element of the input vector. In one implementation, this may be done by incrementing by one the value of the element of the first output vector corresponding to the selected element when a comparison identifies a match. In this implementation, the values of the elements of the first output vector must be equal to zero or set equal to zero before they are processed.

Figure 1A:
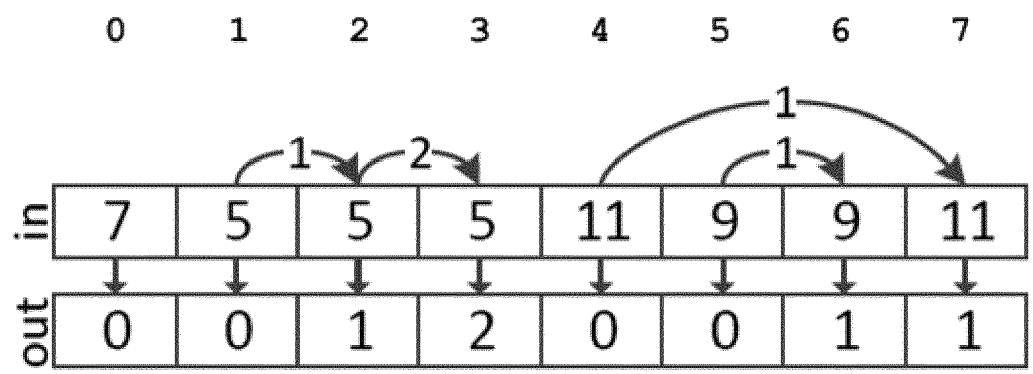
FIG. 1a shows an illustrative example of the VPI instruction semantics.

FIG. 1a shows an illustrative example of the VPI instruction semantics. The elements are processed from left to right. In the example of FIG. 1a, the value 5 is encountered for the first time in the position with index 1 of the input vector (in). Up to this point all elements of the output vector (out) are equal to 0. Then, the value 5 is encountered again for the second time in the position with index 2. As a consequence, the position with index 2 of the output vector (out) is set to 1, which corresponds to the number of prior instances of the value of the element in the position with index 2. Then in the position with index 3 the value 5 is encountered for the 3rd time. As a consequence, the position with index 3 of the output vector (out) is set to 2, which corresponds to the number of prior instances of the value of the element in the position with index 3.

Figure 2:
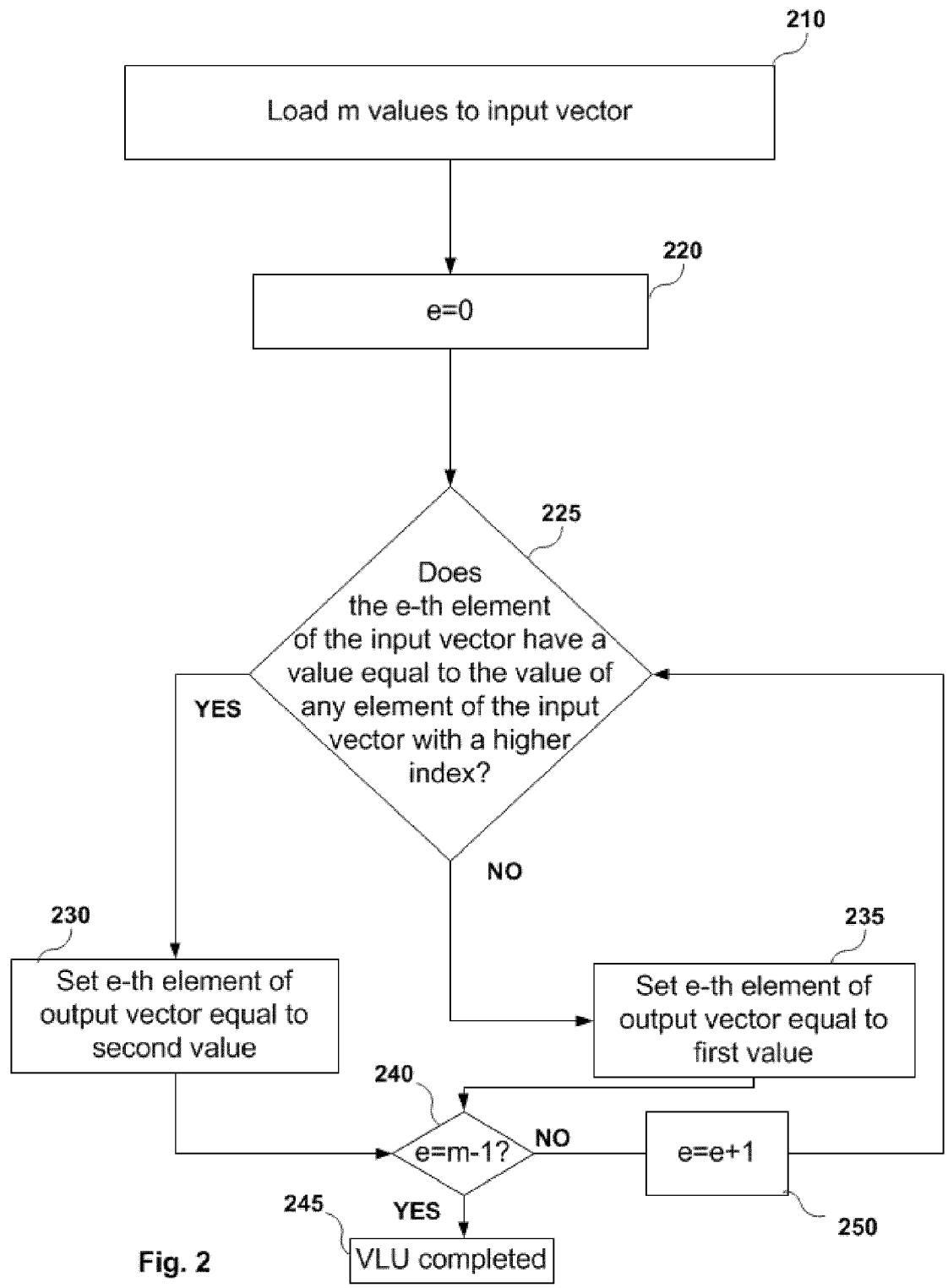
FIG. 2 shows an example flow diagram of a method of calculating the last unique instances of a vector.

FIG. 2 shows an example flow diagram of a method of calculating the last unique instances of a vector. In first step 210, m values are loaded to a vector, hereafter called input vector. A vector of the same number of elements as the input vector, hereafter known as second output vector, is generated having the same indexes. Each element of the input vector corresponds to the element of the second output vector having the same index. Then, in step 210, e is set equal to 0. In step 225, it is checked if the corresponding element (e-th) of the input vector has a value equal to the value of any element of the input vector with an index higher than the index of the corresponding element. If no, then in step 235 the value of the e-th element of the second output vector is set equal to a first value. If yes, then in step 230 the value of the e-th element of the second output vector is set equal to a second value. In step 240 it is checked if all elements have been processed, i.e. if e=m−1. If this is so, then the process ends in 245 where VLU is considered completed. Otherwise e is incremented in 250 and the process continues.

Figure 2A:
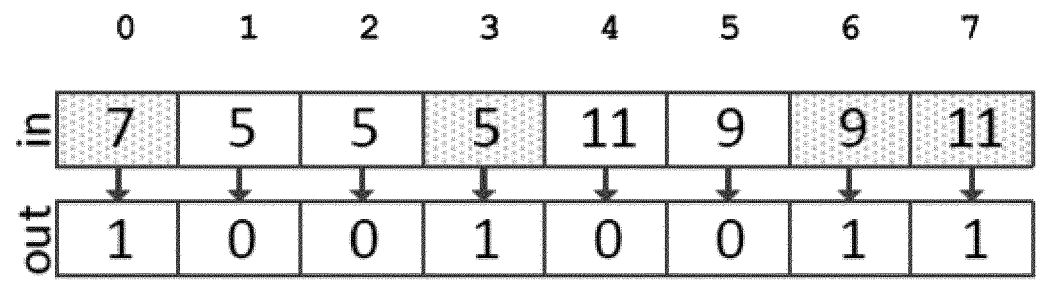

FIG. 2a shows an illustrative example of the VLU instruction semantics. The output vector (out) may be considered a vector mask where each element is a bit. The first value may be 1 and the second value may be 0. A bit in the output vector is set only if the corresponding value in the input vector is not seen afterwards. These cases are shaded in the input vector. In the example of FIG. 2a, the elements of the output vector with indexes 0, 3, 6 and 7 are set to 1, as they correspond to the last unique instance of the values of the elements of the input vector.

Figure 3:
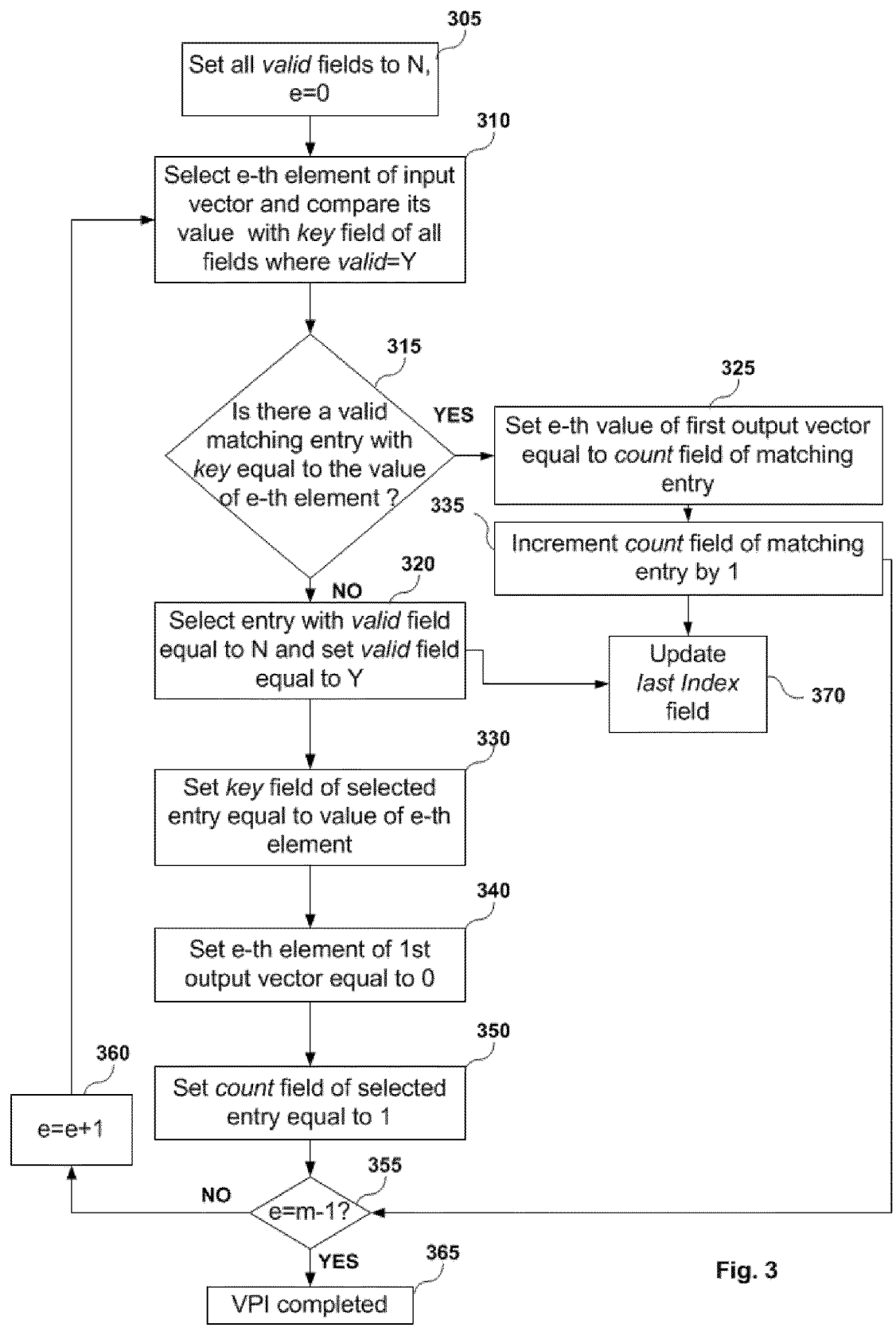
FIG. 3 shows an example flow diagram of a method of calculating the prior instances of a vector using a Content Addressable Memory (CAM).

FIG. 3 shows an example flow diagram of a method of calculating the prior instances of a vector using a Content Addressable Memory (CAM). The CAM may have a number of entries equal to the number of elements (m) of the input vector. Each entry may comprise at least a key field, a count field and a valid field. An entry is considered valid when its valid field is set equal to a third value, e.g. equal to Y, and not valid when set equal to a fourth value, e.g. when equal to N. In a first step 305, the valid field of all entries is set to N. Also e is set equal to 0. Then, the e-th element of the input vector is selected. In step 310 the value of the selected element is compared with the key field of all valid entries. In step 315, it is checked if a matching entry is identified, i.e. an entry having a key field equal to the value of the selected (e-th) element. If the answer is yes, then in step 325, the value of the element of the first output vector corresponding to the selected element (e-th) is set equal to the count field of the matching entry. If not, then, in step 320, a new valid entry is generated. Following step 325, the count field of the matching entry is incremented by one in step 335. Then the process continues in step 355. Now, in step 320, to generate the new valid entry, the valid field of a non-valid entry is set equal to the third value, e.g. Y. Then, in step 330 the key field of the selected entry is set equal to the value of the selected e-th element. In step 340, the value of the element of the output vector corresponding to the selected element (e-th) is set equal to zero. In step 350, the count field of the selected entry is set equal to one. Finally, in step 355 it is checked if e=m−1, i.e. if all elements have been processed. If the answer is yes, the process ends in step 365 and VPI is considered completed. Otherwise, in step 360, e is set equal to e+1 and the process continues for the next element from step 310.

Each entry may further comprise a last index field. The last index field may be updated in step 370, either after step 335 when a matching entry is identified or after step 320, when a new valid entry is generated. The updated last index field is then set equal to the index of the selected element.

Figure 3A:
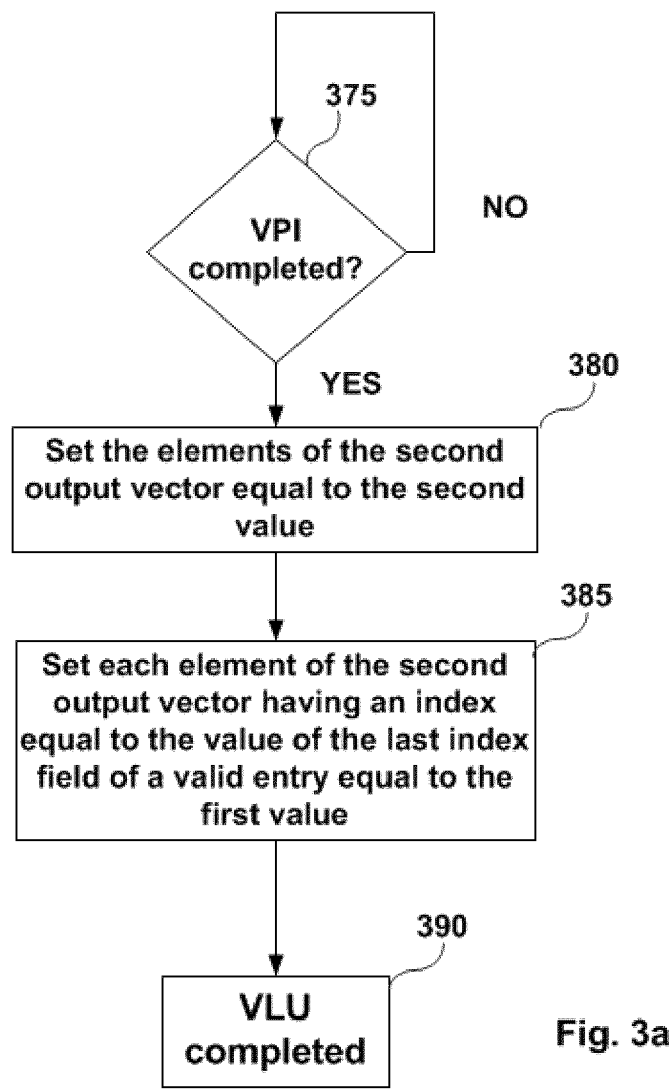
FIG. 3a shows an example flow diagram of a method of calculating the last unique instances of a vector using a Content Addressable Memory (CAM) after VPI has been calculated.

FIG. 3a shows an example flow diagram of a method of calculating the last unique instances of an input vector using a Content Addressable Memory (CAM) after VPI has been calculated. In step 375, it is checked if the last index field for all elements has been updated, i.e. if VPI is completed. If not, then the process waits until this condition is met. After updating the last index field for all elements then the process continues in step 380. In step 380, the elements of the second output vector are set equal to the second value. In step 385, each element of the second output vector having an index equal to the value of the last index field of a valid entry is set equal to the first value. In step 390 VLU is considered completed.

Figure 4:
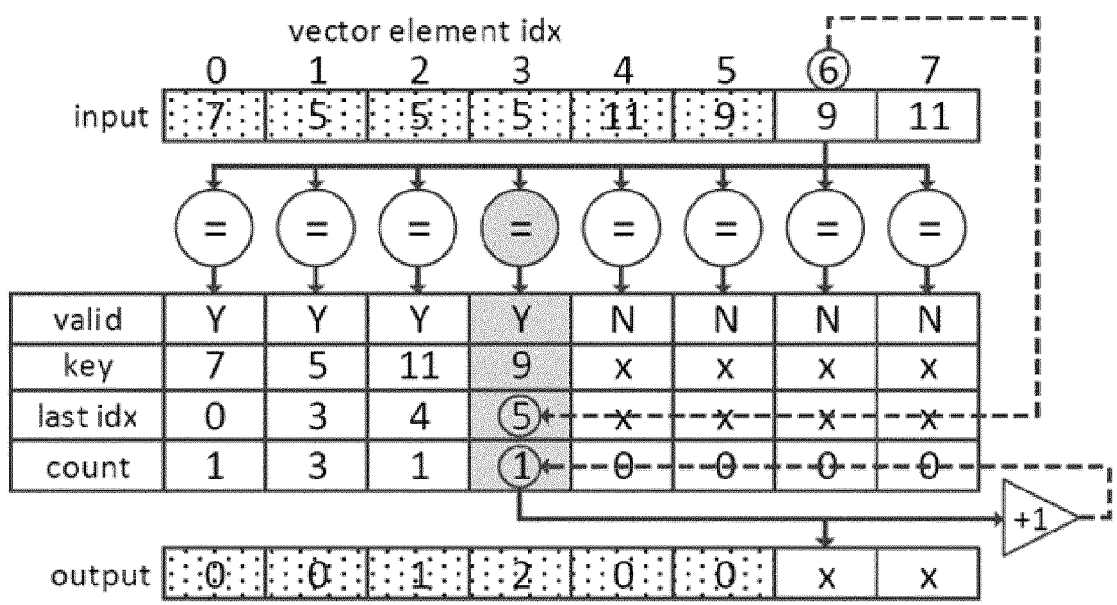
FIG. 4 shows an example implementation to calculate VPI using a CAM memory.

FIG. 4 shows an example implementation to calculate VPI using a CAM memory. The diagram shows the state of the process at an intermediate step before the instruction has completed. Six of the eight elements of the input vector have already been processed and six of the eight elements of the output vector have been calculated (shown with a dotted pattern). The seventh element of the input vector is being processed and the corresponding element of the output vector is just about to be calculated. The CAM memory shown in FIG. 4 comprises eight entries. Each entry comprises a valid, a key, a last index (last idx in the figure) and a count field. During the illustrated step, four valid fields are set to Y and the rest are set to N. The value 9 of the element with index 6 of the input is now used to access the CAM. As the value 9 has already been encountered in a previously processed element (element with index 5) there is already a valid entry with a key field equal to the value of the element of the input vector with index 6.

Therefore, the value located in the count field of the valid entry is copied into the seventh element of the first output vector. This value is equal to 1 because there has been exactly one element of input encountered up until this point with the value 9. Afterwards the count field is incremented by 1 and the value of the corresponding last idx field is updated to 6 as this refers to the most recent index of the input vector where the value 9 has been observed.

The last idx field is not used to calculate VPI however it is relatively simple to update this field when updating count, this way if VLU is executed after VPI using the same input, all that remains to be done is to convert the array of last idx values to a bitmask. This can be done in relatively few cycles.

A way to optimize the above process is to select and process in parallel a plurality of elements of the input vector using multiple lanes, as defined in Asanović, 1998, p. 32, section 3.3. One obvious obstacle to extend this implementation to multiple lanes is that the methods for calculating prior instances and last unique elements are defined serially. Adjacent elements of the input vector may be arranged into groups. The elements within a group may be processed in parallel provided they do not conflict with one another otherwise they are processed serially. Detecting conflicts requires $ll/(2\cdot(l-2))$ comparators where l is the number of parallel lanes targeted, i.e. the group size.

Figure 5:
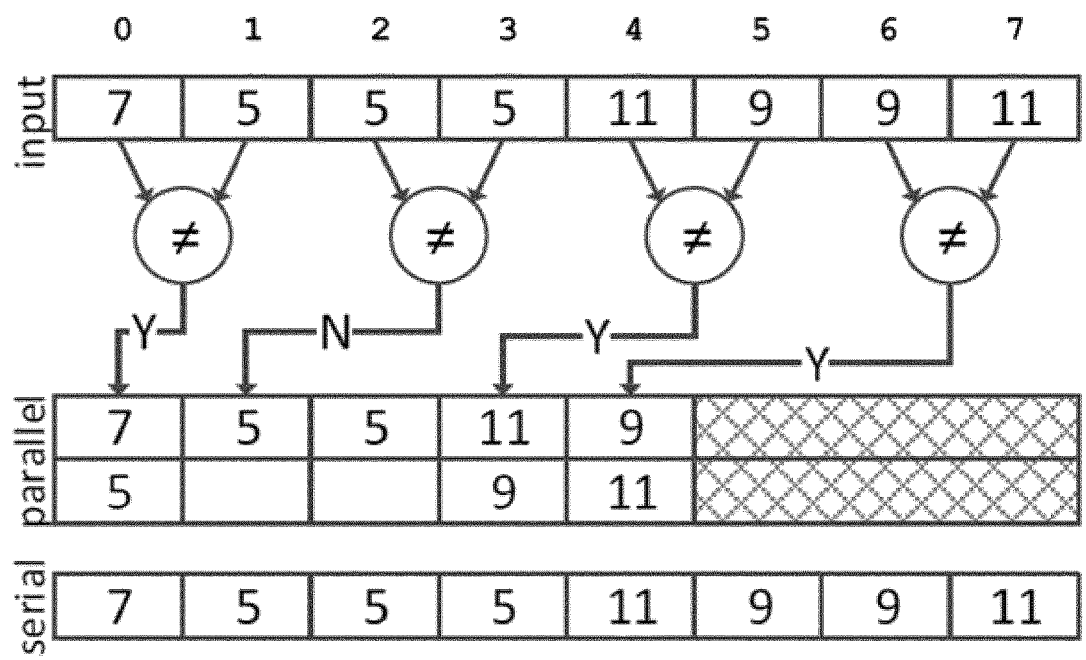
FIG. 5 illustrates a parallel optimization using two parallel paths (or lanes).

FIG. 5 illustrates a parallel optimization using two parallel paths (or lanes). There is an input vector which is processed from left to right and underneath there are two timelines that represent the relative execution time of both the parallel and serial implementations. Each block of the timelines represents the time that is required to process one element, however the parallel timeline shows stacked blocks meaning the elements of this group are processed in tandem. The first, third and fourth groups of elements can be processed in parallel as there are no conflicts. The second group of elements has a conflict and needs to be serialized. The hatched box represents the relative time saved over the serial implementation.

Figure 6:
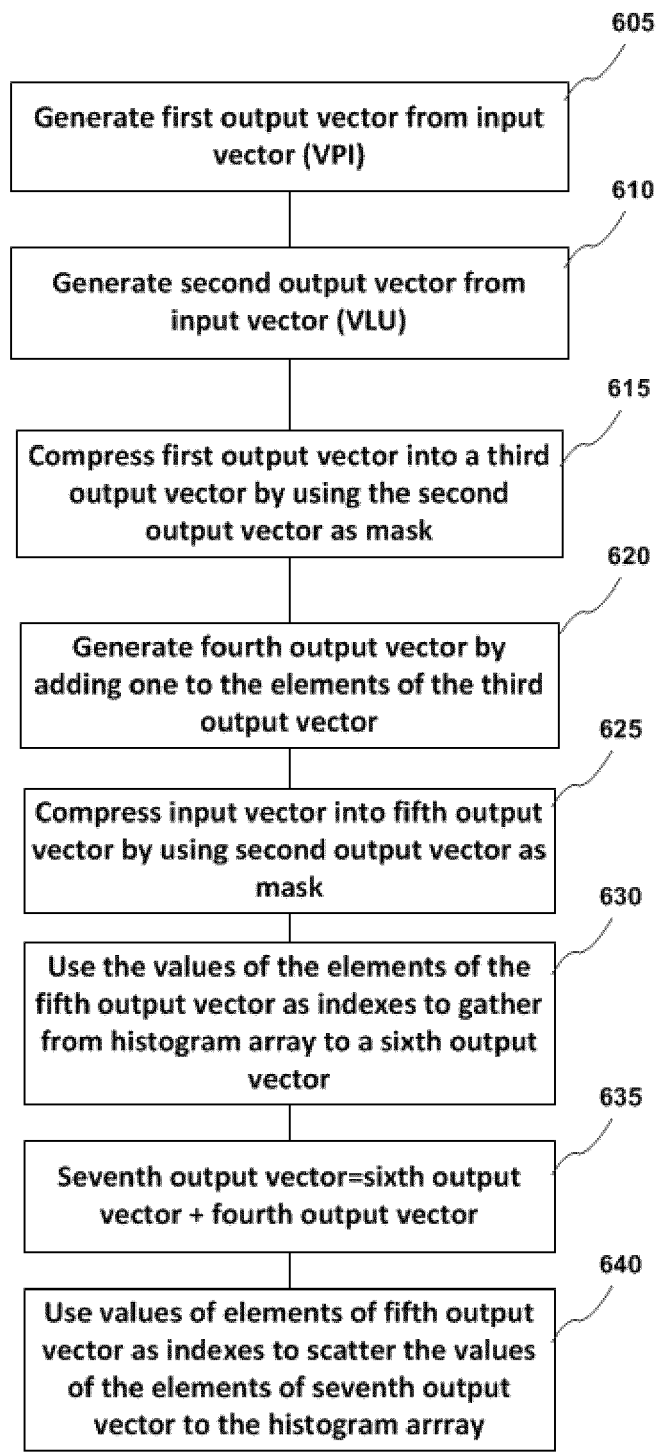
FIG. 6 shows an example flow diagram of a method of updating a histogram array with the values of the input vector.

FIG. 6 shows an example flow diagram of a method of updating a histogram array with the values of the input vector. In step 605, a first output vector may be generated from the input vector using the VPI instruction as described with reference to FIG. 1 or 3. In step 610, a second output vector may be generated from the input vector using the VLU instruction as described with reference to FIG. 2 or 3a. In step 615, the first output vector is compressed into a third output vector by using the second output vector as mask. The elements of the first output vector corresponding to elements of the second output vector having the first value are selected by the compress instruction. In step 620, a fourth output vector is generated by adding one to the values of the elements of the third output vector. In step 625, the input vector is compressed into a fifth output vector by using the second output vector as mask. In step 630, the values of the elements of the fifth output vector are used as indexes to gather from the histogram array to a sixth output vector. In step 635, a seventh output vector is generated by adding the values of the elements of the sixth output vector and of the fourth output vector. In step 640, the values of the elements of the fifth output vector are used as indexes to scatter the values of the elements of the seventh output vector to the histogram array.

Figure 7:
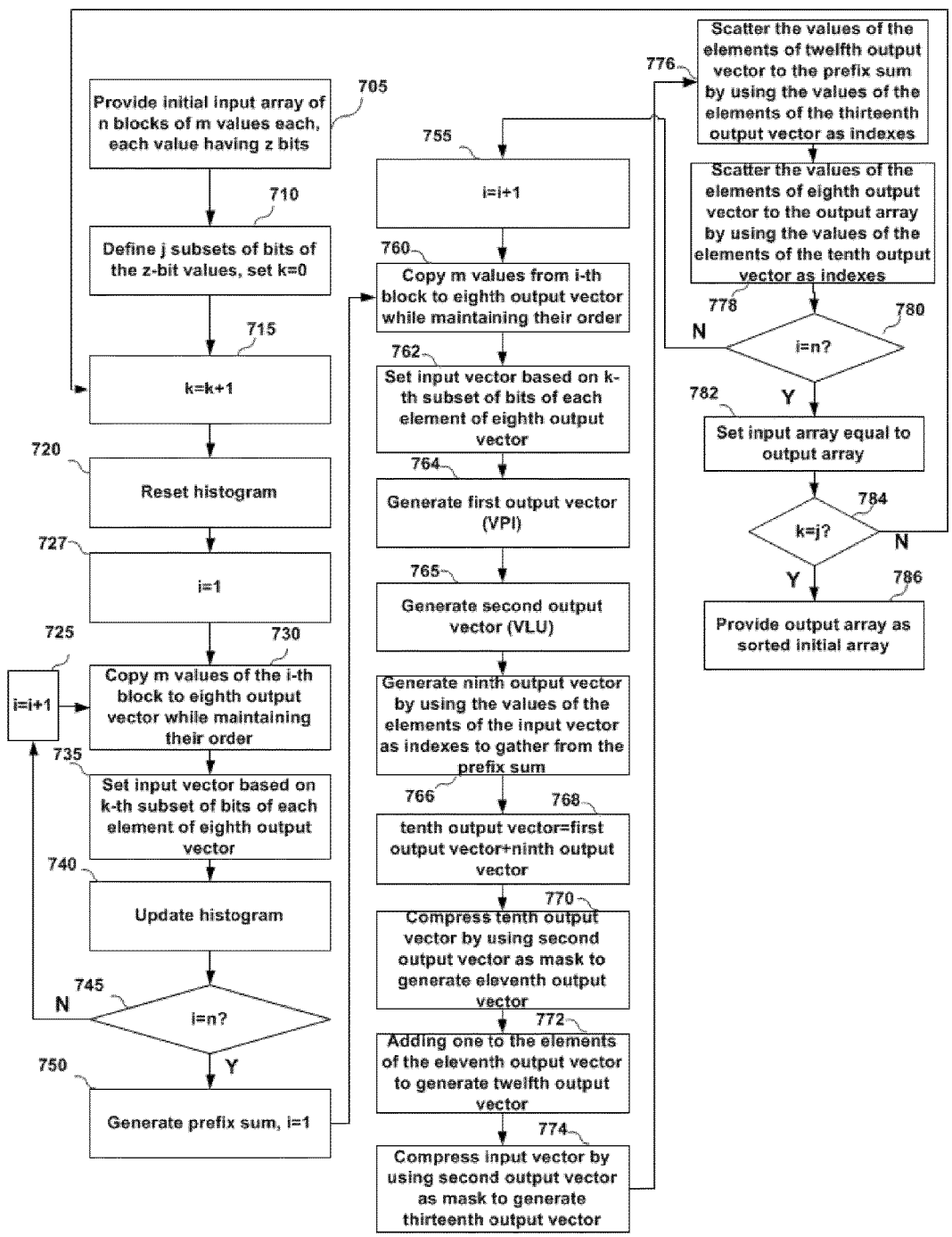
FIG. 7 shows an example flow diagram of a method of sorting an input array.

The above described instructions and implementation may be used to handle conflicts in a vectorized sorting algorithm, such as Radix sort. FIG. 7 shows an example flow diagram of a method of sorting an input array. In first step 705, an initial input array having at most n×m values organized in at least n consecutive blocks of at most m consecutive values, each value having z number of bits is provided. Then, in step 710, a plurality j of subsets of bits of the values is defined. Let $z_k$ be the number of bits of subset k, k=1 to j, wherein $z_1+z_2+\ldots+z_j=z$ and wherein all bits of a subset k-1 (k=2 to j) are less significant than all bits of a subset k. Furthermore, k is set to 0. Then, in step 715, k is set to k+1. Then, in step 720, the histogram array is reset by setting all its values to zero. In step 727, i is set to 1. Then in step 730 the values of an eighth output vector are set equal to the values of the i-th block while maintaining in the eighth output vector the consecutive order said values had in the input array. In step 735, the value of each element of the input vector is set equal to the k-th subset of bits of the value of the element in the eighth output vector having the same index. In step 740, the histogram array may be updated with the input vector according to the method described with reference to FIG. 6. Now, in step 745, the process checks if all n blocks have been processed, i.e. if i=n. If not, then i is set equal to i+1 in step 725 and the process repeats from step 730 until i=n. Then, in step 750 a prefix sum of the histogram array is generated and i is set to 1. The value of the first element of the prefix sum is set equal to zero and the value of each of the rest of the elements of the prefix sum is set equal to the sum of the value of the element having the previous index in the prefix sum plus the value of the element of the histogram array having the same previous index. Then the following process is repeated until i=n; in step 760, the values of an eighth output vector is set equal to the values of the i-th block while maintaining in the eighth output vector the consecutive order said values had in the input array. In step 762, the value of each element of the input vector is set equal to the k-th subset of bits of the value of the element in the eighth output vector having the same index. In steps 764, 765 the VPI and VLU instructions are used to generate the first and second output vectors. The VPI, VLU instructions may be implemented according to examples disclosed herein with reference to FIGS. 1, 2, 3 and 3a. In step 766, a ninth output vector is generated by using the values of the elements of the input vector as indexes to gather from the prefix sum. In step 768, a tenth output vector is generated by adding the values of the elements of the first output vector to those of the ninth output vector. In step 770, the tenth output vector is compressed into an eleventh output vector by using the second output vector as mask. In step 772, one is added to the values of the elements of the eleventh output vector to generate a twelfth output vector. In step 774, the input vector is compressed into a thirteenth output vector by using the second output vector as mask. In step 776, the values of the elements of the thirteenth output vector are used as indexes to scatter the values of the elements of the twelfth output vector to the prefix sum. In step 778, the values of the elements of the tenth output vector are used as indexes to scatter the values of the elements of the eighth output vector to the output array. In step 780 it is checked if i=n. If i=n, then the input array is set equal to the output array in step 782. Otherwise the process repeats from step 755 where i is incremented by 1, until i=n. Finally, in step 784 it is checked if k=j. If so, the output array is provided as the sorted initial input array in step 786. Otherwise the process repeats from step 715 until k=j.

Figure 8:
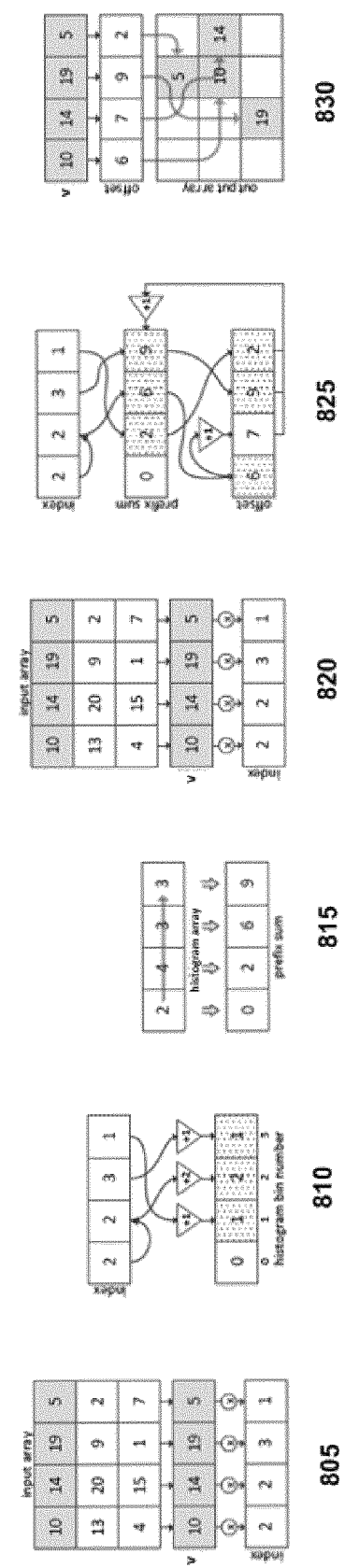
FIG. 8 shows a high-level overview of an example of the proposed sorting algorithm when i=1 and k=1.

FIG. 8 shows a high-level overview of an example of the proposed sorting algorithm when i=1 and k=1. In steps 805 and 810 the input is loaded iteratively and a histogram array is created for the first subset of the input's bits. In step 805 the input is loaded into a vector (v) and the first subset of bits of these values are selected. Step 805 corresponds to steps 730 and 735 of FIG. 7. In step 810, the vector of selected bits is used to update a histogram array. Step 810 corresponds to step 740 of FIG. 7. Steps 805 and 810 are repeated for the rest of the blocks of the input array (not shown). In a next step, step 815, a prefix sum is performed over the histogram array. Step 815 corresponds to step 750 of FIG. 7. In steps 820, 825 and 830, the entire input array is loaded again and scattered to an output array with indexes determined by the prefix sum. In step 820 the input is reloaded into a vector in an identical way to step 805 and the same subset of bits is selected. Step 820 corresponds to steps 760 and 762 of FIG. 7. Then, in step 825 the selected bits are indexes into the prefix sum which is read and incremented. The prefix sum is updated. The values loaded from the prefix sum are modified according to the calculated prior instances and are stored in a vector (offset) used in the next step 830. Step 825 corresponds to steps 764 to 776. Finally, in step 830, the values of the elements of the offset are used as indexes to scatter the values of the elements of vector v to the output array. Step 830 corresponds to step 778 of FIG. 7. Steps 820, 825 and 830 are repeated for the rest of the blocks of the input array (not shown).

Although only a number of particular embodiments and examples have been disclosed herein, it will be understood by those skilled in the art that other alternative embodiments and/or uses and obvious modifications and equivalents thereof are possible. Furthermore, the disclosure covers all possible combinations of the particular embodiments described. Thus, the scope of the disclosure should not be limited by particular embodiments.

Further, although the examples described with reference to the drawings comprise computing apparatus/systems and processes performed in computing apparatus/systems, the disclosure also extends to computer programs, particularly computer programs on or in a carrier, adapted for putting the system into practice.

The invention claimed is:

1. In a vector processing system for processing a plurality of values belonging to a data set, the vector processing system comprising at least an input vector having a number of elements with a unique index assigned to each element, the indexes assigned in an ascending order, the ascending order corresponding to the position of the elements in the input vector, a method, implemented as single instruction multiple data (SIMD) instructions, for discovering multiple instances of recurring values within the input vector, comprising:
   loading the values to the input vector;
   selecting each element of the input vector;
   comparing each selected element with all elements of the input vector having an index lower than the index of the selected element, to calculate the number of matches for the selected element, wherein the number of matches is the number of elements having the same value as the selected element; and
   generating a first output vector of the same number of elements as the input vector and the same indexes, wherein each element of the input vector corresponds to the element of the first output vector having the same index, wherein each element of the first output vector has a value equal to the number of matches calculated for the corresponding element of the input vector;
   wherein the first output vector is an intermediate vector that enables the generation of other output vectors.

2. The method according to claim 1, further comprising:
   setting the values of the elements of the first output vector equal to zero; for each selected element of the input vector,
   for each element in the input vector having an index lower than the index of the selected element:
      comparing the value of the selected element with the value of the element in the input vector having an index lower than the index of the selected element to identify a match, and
      wherein generating a first output vector comprises:
         incrementing by one the value of the element of the first output vector corresponding to the selected element when the comparing identifies a match.

3. The method of claim 1, further comprising:
   generating a second output vector of the same number of elements as the input vector and with the same indexes, wherein each element of the input vector corresponds to the element of the second output vector having the same index; and
   wherein the value of each element of the second output vector is set equal to a first value unless the corresponding element of the input vector has a value equal to the value of an element of the input vector with an index higher than the index of the corresponding element, thereby the value of the element of the second output vector is set equal to a second value.

4. The method according to claim 3, wherein the second output vector is a vector mask.

5. The method of claim 1, further comprising:
   using a Content Addressable Memory (CAM) having a number of entries equal to the number of elements of the input vector, each entry comprising at least a key field, a count field and a valid field, wherein an entry is valid when the entry's valid field is set equal to a third value and not valid when the entry's valid field is set equal to a fourth value;
   setting the valid field of all entries equal to the fourth value;
   selecting each element of the input vector in an index ascending order, wherein comparing each selected element with all elements of the input vector having an index lower than the index of the selected element comprises:
   comparing the value of the selected element with the key field of all valid entries to either identify a matching entry having a key field equal to the value of the selected element or generate a new valid entry otherwise,
   wherein
      when a matching entry is identified, then:
         the value of the element of the first output vector corresponding to the selected element is set equal to the count field of the matching entry, and then
         the count field of the matching entry is incremented by one;
      when no match is found a new valid entry is generated, and then:
         a not valid entry is selected;
         the valid field of the selected entry is set to the third value;
         the key field of the selected entry is set equal to the value of the selected element;
         the value of the element of the first output vector corresponding to the selected element is set equal to zero; and then
         the count field of the selected entry is set to one.

6. The method according to claim 5, wherein each entry further comprises a last index field, wherein either the last index field of a matching entry is updated when a matching entry is identified or the last index filed of a new valid entry is updated when the new valid entry is generated, and
   wherein the updated last index field is set equal to the index of the selected element.

7. The method according to claim 6, wherein, after updating the last index field for all elements, the method further comprises generating the second output vector, and wherein the value of each element of the second output vector having an index equal to the last index field of a valid entry is set equal to the first value and otherwise the value of each element of the second output vector is set equal to the second value.

8. The method according to claim 5, wherein a plurality of elements of the input vector are selected and processed in parallel.

9. The method according to claim 8, further comprising:
selecting simultaneously a plurality of elements of the input vector;
comparing the simultaneously selected values to each other; and
processing in parallel the plurality of values if the comparison does not identify any match.

10. The method according to claim 5, further comprising:
using the second output vector as a mask on the first output vector to select elements of the first output vector and generate a third output vector.

11. The method according to claim 10, wherein generating the third output vector comprises:
identifying the elements of the second output vector having the first value; and
compressing the first output vector into the third output vector by using the elements of the second output vector having the first value as mask.

12. The method according to claim 11, further comprising using the third output vector to increment a histogram array by:
initializing the histogram array;
adding one to the values of the elements of the third output vector to generate a fourth output vector;
compressing the input vector into a fifth output vector by using the second output vector as mask;
using the values of the elements of the fifth output vector as indexes to gather from the histogram array to a sixth output vector;
generating a seventh output vector, by adding the values of the elements of the sixth output vector and of the fourth output vector; and
using the values of the elements of the fifth output vector as indexes to scatter the values of the elements of the seventh output vector to the histogram array.

13. The method according to claim 12, further comprising:
providing an initial input array having at most n×m values organized in at least n consecutive blocks of at most m consecutive values, each value having z number of bits,
defining a plurality j of subsets of bits of the values, where $z_k$ is the number of bits of subset k, k=1 to j, wherein $z_1+z_2+ \ldots +z_j=z$ and wherein all bits of a subset k−1, k=2 to j, are less significant than all bits of a subset k;
repeating for each subset of bits k, k=1 to j, starting from k=1 and in a consecutive order:
resetting the histogram array by setting all of the histogram array values to zero;
repeating for each block i, i=1 to n, starting from i=1 and in a consecutive order:
setting the values of an eighth output vector equal to the values of the block while maintaining in the eighth output vector the consecutive order the values had in the input array;
setting the value of each element of the input vector equal to the subset k of bits of the value of the element in the eighth output vector having the same index;
updating the histogram array according to claim 12;
generating a prefix sum of the histogram array, wherein the value of the first element of the prefix sum is set equal to zero and the value of each of the rest of the elements of the prefix sum is equal to the sum of the value of the element having the previous index in the prefix sum plus the value of the element of the histogram array having the same previous index;
repeating for each block i, i=1 to n, starting from i=1 and in a consecutive order:
setting the values of an eighth output vector equal to the values of the block while maintaining in the eighth output vector the consecutive order the values had in the input array;
setting the value of each element of the input vector equal to the subset k of bits of the value of the element in the eighth output vector having the same index;
generating the first and second output vectors;
generating a ninth output vector by using the values of the elements of the input vector as indexes to gather from the prefix sum;
generating a tenth output vector by adding the values of the elements of the first output vector and the ninth output vector;
compressing the tenth output vector into a eleventh output vector by using the second output vector as mask;
adding one to the values of the elements of the eleventh output vector to generate a twelfth output vector;
compressing the input vector into a thirteenth vector by using the second output vector as mask;
using the values of the elements of the thirteenth vector as indexes to scatter the values of the elements of the twelfth output vector to the prefix sum;
using the values of the elements of the tenth output vector as indexes to scatter the values of the elements of the eighth output vector to the output array;
setting the input array equal to the output array; and
providing the output array as the sorted initial input array.

14. The method according to claim 13, wherein $z_k$=b and the histogram array comprises $2^b$ bins.

15. The method according to claim 14, wherein $z_k$=2 and the histogram array comprises $2^2$ bins.

16. A computing device comprising a memory and a processor, wherein the memory stores computer program instructions executable by the processor, the instructions comprising functionality to execute a method according to claim 1.

17. A computer program product comprising instructions that when executed using a computing device implements a method according to claim 1.

* * * * *